(12) United States Patent
Zillig et al.

(10) Patent No.: US 7,083,546 B2
(45) Date of Patent: Aug. 1, 2006

(54) SIGNAL TRANSMISSION DEVICE

(76) Inventors: Freya Zillig, Silker Weiche 44 b, 21465, Reinbek (DE); Bodo Zillig, Silker Weiche 44 b, 21465, Reinbek (DE)

( * ) Notice: Subject to any disclaimer, the term of this patent is extended or adjusted under 35 U.S.C. 154(b) by 374 days.

(21) Appl. No.: 10/365,741

(22) Filed: Feb. 12, 2003

(65) Prior Publication Data

US 2004/0097331 A1     May 20, 2004

(30) Foreign Application Priority Data

Feb. 13, 2002  (DE)  .......................... 202 02 667 U
Nov. 21, 2002  (DE)  .......................... 202 18 051 U (51) Int. Cl.
*A63B 21/00*      (2006.01)

(52) U.S. Cl. ..................... 482/8; 482/1; 482/9; 482/900

(58) Field of Classification Search ................ 482/1–9, 482/900–902
See application file for complete search history.

(56) References Cited

U.S. PATENT DOCUMENTS

| | | | |
|---|---|---|---|
| 5,888,172 A | 3/1999 | Andrus et al. | |
| 6,004,243 A | 12/1999 | Ewert | |
| 6,142,913 A * | 11/2000 | Ewert | 482/8 |
| 6,152,856 A * | 11/2000 | Studor et al. | 482/8 |
| 6,244,988 B1 * | 6/2001 | Delman | 482/8 |

* cited by examiner

*Primary Examiner*—Glenn E. Richman
(74) *Attorney, Agent, or Firm*—Cantor Colburn LLP (57) ABSTRACT

The invention concerns a device for signal transmission from a signal transmitter which senses physical operating conditions to a separately installed signal receiver. In order to create a device by means of which the player of a PC or video game is given the possibility of interactive engagement in the course of the game, whereby said device is compatible, for purposes of control, with all of the video game consoles and PCs commonly to be found in trade, the invention proposes a device for signal transmission, wherein an electronic circuit is connected to the signal transmitter, on one hand, and to the signal receiver, on the other hand, and the signals generated by the signal transmitter may be converted, by means of said electronic circuit, to the structure required for the signal receiver, whereby the signal transmitter, in order to sense at least one physical operating condition, is connected to an exercise machine, and whereby a PC or a video game console is provided as the signal receiver.

22 Claims, 4 Drawing Sheets

SIGNAL TRANSMISSION DEVICE

FIELD OF THE INVENTION

The invention concerns a device for signal transmission from a signal transmitter which transmits physical operating conditions to a separately installed signal receiver.

DESCRIPTION OF THE RELATED ART

Devices of the type described above are known from prior state of technology—for example, from the control of PC or video games. Among the devices used in this type of application are joysticks, game pads, PSX controllers and similar devices, which are directly connected to the PC or the video console, and by means of which the player obtains the possibility of engaging or controlling the game. Movements of the joystick, game pad or PSX controller are converted into appropriate electrical signals and transmitted in the form of digital information to the PC or the video console. There, the incoming information signals are encoded and converted into corresponding movements of the figures represented in the video game.

A factor common to all of the aforementioned signal transmitters, however, is that the player him/herself does not become actively involved in the game, but rather, remains as an external, passive participant, who is merely capable of accomplishing movements within the PC or video game by moving the joystick, game pad or PSX controller.

A further disadvantage lies in the fact that PC or video game consoles are not compatible with each other. This means that is not possible to use one and the same joystick, game pad or PSX controller in order to connect to various video game consoles or to the PC. At this time, frequently used video game consoles include the Microsoft X-Box, the Sony Playstation and the Nintendo Gamecube. Each of these video game consoles has its own type of plug and socket system for the connection of suitable control devices; moreover, each of the consoles has a different type of electronic circuitry. This means that, even if a plug-in adapter is inserted between the game console, on one hand, and the control device, on the other hand, the use of one and the same control device for the game consoles set forth above is not possible. Moreover, both the electronic circuitry and the connections of video game consoles are different from those of the PCs commonly to be found in trade—for example, IBM-compatible PCs—meaning that there can be no compatibility between these devices as well.

SUMMARY OF THE INVENTION

Based on that set forth above, the task of the invention is to create a device for signal transmission, by means of which the player of a PC or video game is given the possibility of interactive engagement in the course of the game, whereby said device is compatible, for purposes of control, with all of the video game consoles and PCs commonly to be found in trade.

A device for signal transmission, includes electronic circuitry which is connected, on one hand, to the signal transmitter and, on the other hand, to the signal receiver, and, by means whereof, the signals generated by the signal transmitter may be converted to the structure required for the signal receiver, whereby the signal transmitter, in order to sense at least one physical operating condition, is connected to an exercise machine, and whereby a PC or a video game console is provided as the signal receiver.

One of the advantages of the device according to the invention is the possibility of connection to all of the video game consoles and PCs commonly to be found in trade. This is achieved by means of the electronic circuitry, which is intended for connection to the signal receiver—for example, the video game console or the PC, and by means of which the signals to be sent to the signal receiver are modulated, as a function of the signal structure required by the signal receiver connected thereto at the time. The independence of the device according to the invention, relative to both the signal transmitter and the signal receiver, is achieved by means of a system-independent interface, which enables adaptation of compatibility with regard to the signal transmitter, on one hand, and the signal receiver, on the other hand, thus enabling connection and communication between a signal receiver and a signal transmitter which are, in and of themselves, not mutually compatible.

An additional advantage of the device according to the invention is the possibility of making use of signal transmitters which, for example, are available as integral parts of an exercise machine. The use of such signal transmitters especially enables the player, in a very simple and especially cost-effective way, to achieve interactive connection with the video or PC game that he or she desires to play. In such a way, as a function of the exercise machine use, by means of suitable sports activities, the player's exertions may be used in order to achieve control of the video or PC game. Through the use of suitable electronic circuitry, the device according to the invention thus enables the connection of an exercise machine to all of the video game consoles or PC's commonly to be found in trade, so that, with regard to the signal receiver, there are no limitations of any kind in respect of the use of the device according to the invention.

Exercise machines, as such, are known from prior state of technology in a plurality of configurations. They offer the users thereof, in a simple way, the possibility of keeping themselves active in sports. For the purpose of monitoring the user's physical constitution and of increasing his or her motivation, the exercise machines commonly to be found in trade are generally equipped with performance displays, which enable the user to obtain a statistical evaluation or a graphic display of the sports performance achieved. Thus, for example, bicycle-type exercise machines are known, which, throughout the use of the device, record the speed generated and the virtual distance traveled. In this way, the user can undergo a specifically oriented training program, in which, for example, he or she is required to achieve defined speeds within defined intervals of time, and to maintain those speeds throughout a defined duration. In addition, many exercise machines offer the possibility of measuring the user's pulse, so that, through a combination of the effort values achieved, on one hand, and the values reflecting the user's physical parameters, on the other, conclusions may be drawn with regard to the user's condition, the amount of fat burned, and the like. For the purpose of performing such calculations and/or for the statistical evaluation of the measured data, exercise machines commonly to be found in trade are equipped with computers specifically designed for exercise machines and displays connected thereto, which may be viewed by the user of the exercise machine even during the training exercise.

Notwithstanding the equipment with which exercise machines commonly to be found in trade are provided, as described above, the use of such devices for long periods of time is extremely monotonous. This has the disadvantage of adversely affecting the motivation of the respective user. In order to overcome this problem, exercise machine systems are known from prior state of technology, which, in addition to the actual exercise machine, are equipped with additional information and/or entertainment components. For example, there are exercise machines which are made in the form of a rowing machine, and which, when integrated with a large screen, give the user the impression that he or she is actually in the boat displayed on the integrated screen, and that the rowing motions which he or she performs on the rowing machine have the effect of propelling the boat displayed on the screen forward. These systems are also known in the area of golf; in this area, by means of the device resembling a flight simulator, the user can strike a really existing ball, whereby the acceleration and velocity data recorded by means of suitable sensors at the moment of impact are transmitted to an imaginary ball, and the trajectory of said imaginary ball is then displayed on a screen provided for that purpose.

Systems of the type described above have the ability to arouse a far higher degree of motivation in the users thereof. Nonetheless, they exhibit a decisive disadvantage: the purchase of such systems is extremely cost-intensive, meaning that they can hardly be said to be suitable for private homes. In addition, a certain amount of room—which frequently exceeds even the limits of commercially operated fitness studios—is required for the installation of such devices.

The disadvantages described above are overcome by the device according to the invention. This device especially enables the establishment of a connection between exercise machines, on one hand, and video game consoles, on the other hand, whereby the user of the exercise machine obtains the possibility, through the use of his or her own muscular strength, of interactively controlling a video game. This, on one hand, has the effect of increasing the attractiveness of the exercise machine, because the monotony which was previously a predominant characteristic of the use of such a device is overcome. On the other hand, the control of a video game through the use of the player's own muscular strength constitutes an interactive component which increases the pleasure of the game in its entirety. In this connection, the fact that, through the use of the device according to the invention, it is possible to retrofit existing exercise machines, so as to enable them to connect and communicate with conventional video game consoles or PCs, is especially advantageous. The expense involved in this retrofit is appreciably low. Moreover, the device according to the invention does not itself involve any additional need for room, so that the use of the device according to the invention is possible even in a very small space.

Exercise machines of the types known from prior state of technology—such as, for example, bicycle-type exercise machines, electrical exercise machines, treadmills, rowing machines and the like—make use of a magnetic contact, which, in the case of bicycle-type exercise machines, may be located, for example, on the bottom bracket of the flywheel, to record measuring pulses, which are transmitted to a training computer at intervals of various lengths, as a function of the speed of revolution of the flywheel. On the basis of these time intervals, the training computer can then calculate information, such as, for example, time, distance, velocity and calorie consumption, and can display that information on a display with which the exercise machine is equipped.

According to a preferred design of the device, the signal generated on the exercise machine and transmitted to the training computer of the exercise machine is branched off and transferred to the electrical circuit provided in the device according to the invention. This can be accomplished, for example, by means of a Y-gate, so that the signal transmitter included in the exercise machine provides a signal both to the training computer and to the electronic circuitry of the device according to the invention. Within the electronic circuitry, the signal transmitted by the signal transmitter is then modulated, in accordance with the signal structure required by the signal receiver connected at the time, and transferred to the signal receiver. In so doing, the electronic circuitry of the device according to the invention converts the pulses measured by the exercise machine into digital information, which is then transmitted to the signal receiver and, for example, is used to control a video or PC game. Especially suitable for this purpose are video or PC games in which velocity-dependent control is used—for example, in order to control a car, a bicycle or a set other vehicle—so that, as a function of the speed achieved on the exercise machine, a corresponding forward motion is generated in the video or PC game. Advantageously, in this process, the velocity curve (from "slow" to "fast") of the exercise machine is mapped onto a second curve with a greater interval, so that a parallel increase in velocity takes place on both curves. The more quickly the exercise machine goes, the faster the speed appears in the game and vice versa. For the transmission of the speeds involved, it is advantageous to make use of a shifted interval, so that the exercise machine, by means of a virtual effect, can appear to reach high speeds, according to the game used.

The additional input commands which are required in order to control a video or PC game can be input by the player, by means of at least one additional signal input unit. Such a signal input unit exhibits a plurality of function keys and is connected to the electronic circuitry of the device according to the invention and such a way as to enable communication between them. The number of function keys on signal input unit is that number which is generally required for the control of the play functions: for PC games, this is generally five function keys, whereas, for console games, up to nine function keys may be required. By means of the function keys, the remaining functions of a video or PC game—such as, for example, steering, braking and switching functions—are controlled.

Through the combined use of the signal transmitter provided on the exercise machine, on one hand, and the signal input unit provided for the control of the remaining functions of the video or PC game, on the other hand, the velocity aspect of the video or PC game is directly controlled by means of the energy applied by the player. In this connection, a relationship is established between the effort exerted by the player, on one hand, and the velocity achieved in the game, on the other hand.

\*\*It is advantageous for the device according to the invention to enable the interconnection of, and communication between, two existing components—for example, an exercise machine, on one hand, and a video game console or PC, on the other hand—which previously could not be connected to each other in order to communicate with each other. In this way, the use of both of the aforementioned components becomes more attractive. By means of a simple and cost-effective variant, the person—that is, the player—becomes actively involved in the video or PC game, through his or her own movements. Because it is necessary, at the same time as the training on the exercise machine, to react to the requirements of the game as well—for example, by steering, jumping, braking or performing various tasks—the game has the effect of providing comprehensive training for body and mind alike by concentrating on the game, the user's motivation for training is increased, and his or her impression of success can be converted into positive energy If the user—as frequently occurs in the course of training on an exercise machine—becomes so accustomed as to be bored, his or her interest may be awakened by means of a new game. This has the effect of enabling a longer period of use and more regular training sessions, with which better physical results are associated. The investment in the purchase of an exercise machine for private use thereby becomes more attractive for individuals.

Because the functions of the original components—that is, of the exercise machine and the game console or the PC—are not modified, games which already exist, or which are to be developed in future, for PCs or video game consoles, may be used with no requirement for any special programming. In this way, games can also be experienced as virtual reality, even though they were originally not programmed for this purpose.

Through the possibility offered by a video game console or a PC for the simultaneous use of a game by more than one player, a joint training program on the exercise machine may also be implemented. This also offers additional possibilities for private and commercial use.

According to an additional characteristic of the invention, the signal input unit or units is/are arranged within a housing provided for the purpose, whereby each signal input unit has its own housing. The electronic circuitry provided according to the invention is also present in the signal input unit housing, whereby, in cases where several signal input units—that is, several housings—are provided, the electronic circuitry is lodged in one of said housings. The electronic circuitry is connected, for the purpose of communication, to the signal transmitter—for example, the exercise machine—either by radio or by cable. In cases where the connection is implemented by cable, the cable can take the form of a double-pole connecting cable, provided with a double-pole stereo jack on the exercise machine side. For connection of the device according to the invention to a signal receiver—for example, a video game console or a PC—a suitable connection socket is provided, in a form suitable to the signal receiver used. This connection as well—that is, the connection, for the purpose of communication, between the device according to the invention and the signal receiver—can also, as an alternative, be accomplished by radio. Similarly, the individual signal input units used may be connected to each other, for the purpose of communication, either by means of a cable arrangement or by radio.

According to an additional characteristic of the invention, each of the housings intended to hold the signal input units is provided with a fastening device, which, for example, may take the form of a clamping bracket, and which is especially suitable for fastening to the exercise machine. The advantage lies in the fact that the fastening device may be used in order to fasten the signal input units to the exercise machine, in whatever arrangement is preferred by the player for ease of use. In this connection, according to yet another characteristic of the invention, the housing and the fastening bracket may be made of plastic. Naturally, other materials may be used as well, such as, for example, metals or metal alloys.

All in all, the device according to the invention represents an interface, whereby especially the following advantages may be accomplished:
simple connection to the exercise machine;
an external, independent device, such that, following the removal whereof, both the exercise machine and the PC or the video game console may again be used alone;
cost-effective and suitable for home use;
operation without an independent power source;
universal connection to all common types of exercise machines which support training computers;
independent of the game used.

According to an additional, advantageous design of the invention, the device is designed to include separate electronic circuitry which is connected, for the purpose of communication, to the signal transmitter, the signal unit and the signal receiver. By means of this electronic circuitry, the signals from the signal transmitter and the signal input unit may be transmitted in the signal structure required by the signal receiver, whereby a PC or a video game console is provided as a signal receiver. Especially advantageous in this configuration is the separate arrangement of the electronic circuitry. This enables an exchangeable arrangement, so that, by means of a simple exchange of the electronic circuitry, the same exercise machine can be combined with a variety of signal receivers. Specifically, according to the signal receiver used, the system requires a corresponding signal modulation by means of the electronic circuitry, so that, as a function of the signal receiver which the user desires to employ, the system requires the use of electronic circuitry suitable thereto. The separate arrangement of the electronic circuitry enables a simple exchange, whereby the user can choose whether to connect the exercise machine, through the use of the corresponding electronic circuitry, to a video game console or a PC, as he or she sees fit. In addition, the separate arrangement of the electronic circuitry enables manufacturers to provide an integrated arrangement of signal input units on the exercise machine, so that the connection, for the purpose of communication, between the signal input units and the signal receiver is set up only when the appropriate electronic circuitry is included.

For the input of additional control commands, for the purpose of controlling the game which is running on the PC or the video game console connected to the exercise machine, the device according to the invention provides for at least one additional, manually activated signal input unit, which, together with the signal transmitter, is connected to the electronic circuitry according to the invention, for the purposes of communication. Such a signal input unit, for example, serves to transmit additional control commands, such as "up" and "down", "left" and "right", "forward" and "back", to the PC or the video game console. The combination according to the invention of the manually operated signal input unit, on one hand, and the signal transmitter, on the other hand, enables the player, by means of his or her sports performance, to conduct at least one control signal, the interactive coupling, to the PC game or the video game, whereas the remaining control commands required for the operation of the PC game or the video game are selected by means of the manually operated signal input unit. For example, in this context a bicycle-type exercise machine should be considered, which is connected, by means of the device according to the invention, to a PC game or a video game, which shows a vehicle race of any kind—for example, a race involving ships, ground vehicles, aircraft or the like. By means of the bicycle-type exercise machine, the player can control the speed of the vehicle represented in the PC game or the video game, whereby, in order to increase the speed in the game, it is necessary to pedal faster on the bicycle-type exercise machine. To reduce the speed, the player only has to decrease his speed. Being interactively involved in the PC or video game, the player, by means of his or her sports activity on the bicycle-type exercise machine, can directly regulate—that is, control—the speed of the person or the vehicle depicted in the PC or video game. The remaining control commands used to steer the vehicle or the person according to the game are provided by means of, for example, two manually operated signal input units, which are preferably shaped to fit in the human hand and provided on the handlebars of the bicycle-type exercise machine. In this way, the player/user, while seated in the normal position on the bicycle-type exercise machine, will be easily able to access the function keys on both of the signal input units and, in this way, to comfortably input commands by selecting the appropriate function keys. In this connection, it is possible for the signal input units to be provided for the purpose of retrofitting, whereby they will be attached to the handlebars of the bicycle-type exercise machine only if and when they are required. Alternatively, it is also possible to provide an integrated configuration of the signal input units; advantageously; these units would be integrated into the contour of the handlebars of the bicycle-type exercise machine, and could no longer be removed therefrom by the user/player. The latter alternative is especially advantageous in cases where a bicycle-type exercise machine is purchased with the intention of connecting it to a PC or a video game console. The former alternative, on the other hand, is advantageous in cases where an exercise machine already in the possession of a user/player is to be retrofitted, in order to equip it for connection, for the purpose of communication, with a PC or a video game console.

For the purpose of conversion—that is, modeling—of the signals provided by the signal transmitter, on one hand, and the signal input unit, on the other hand, into a signal structure which can be read—that is, interpreted—by the PC or the video game console connected thereto, the device according to the invention is provided with electronic circuitry, which is connected between the signal transmitter and the signal input unit, on one hand, and the signal receiver, on the other hand. The circuitry serves to convert the signals provided on the input end into the signal for required on the receiving end, so that the signals transmitted by the player, by means of the signal transmitter and the signal input unit, are converted into suitable commands for the PC game or the video game running on the PC or the video game console connected thereto. In this connection, it should be noted that the video game consoles commonly available on the market are not compatible with each other, and that this incompatibility applies both to the internal electronics used therein and to the connectable peripheral devices—such as, for example, joysticks, steering wheels, game pads, controllers and the like. Moreover, the same applies to PCs, which are not compatible either with each other or with the aforementioned video game consoles. In this connection, frequently used video game consoles include the Microsoft X-Box, the Nintendo Gamecube and the Sony Playstation. According to the type of the PC and/or the type of video game console to be connected to the exercise machine, it will be necessary to provide appropriate electronic circuitry, in order to enable the signal transmitter and the signal input unit to be compatibly connected, for the purpose of communication, to the signal receiver—that is, the PC or the video game console. In this context, it is especially advantageous for the device according to the invention to ensure that there is no need to replace the signal input unit and/or the signal transmitter, but rather, that it is only necessary to select appropriate electronic circuitry, relative to the signal receiver to be connected to the exercise trainer in the case at hand, and to connect the electronic circuitry between the signal transmitter and the signal input unit, on one hand, and the signal receiver, on the other hand, for the purpose of enabling communication between these units. This type of configuration especially provides the advantage of enabling combinations of any desired exercise machine with any desired signal receiver. The user need only ensure that, in order to connect the exercise machine to of his or her PC or video game console, he or she selects the electronic circuitry which is appropriate for the connection of his or her PC or video game console, and connects it accordingly, in order to achieve connection, for the purpose of communication, between the exercise machine and signal receiver.

In this connection, it is also advantageous to provide, according to the invention, a separate housing, for the specific purpose of arranging electronic circuitry within that housing. This will enable a simple coupling of the exercise machine to any desired signal receiver, whether the coupling takes place within the framework of retrofitting or involves an exercise machine suitably equipped in advance. Specifically, it enables the manufacturing plant to make preparations for the assembly and/or arrangement of the signal transmitter or the signal input unit, irrespective of the signal receiver to be connected thereto. Because the signal transmitter and the signal input unit can be installed and/or assembled in advance, irrespective of the signal receiver to be connected at a later stage, the device can be manufactured in a cost-effective manner and assembled by means of the user-friendly procedure. The only thing that the user will have to do is to connect the particular electronic circuitry selected in accordance with his or her signal receiver, to which connection is desired; this can be simply accomplished by preparing appropriate receptacles on the sides of the exercise machine. In practice, for example, it is possible to arrange for the electronic circuitry, including connecting cables and connectors, to be installed within a suitably constructed housing prior to delivery to the user. In this way, the electronic circuitry is selected according to the signal receiver which the client intends to have the user connect to the exercise trainer at a later stage. In order to connect the exercise machine to the signal receiver for the purposes of communication, all that the user will have to do is to introduce the housing which contains the electronic circuitry into a holder provided for the purpose on the exercise machine and to set up a connection, for the purpose of communication, between the electronic circuitry and the signal receiver, by means of the connecting cable and/or he connector plug provided. The third step then simply involves the connection of the signal transmitter and the signal input unit to the electronic circuitry. In the case of connection for the purpose of communication which is to be set up by means of a cable arrangement, this can be simply achieved by bringing the connector plugs provided on the signal transmitter and on the signal input unit into contact with the correspondingly shaped connector sockets provided on the electronic circuitry. The separate arrangement of the electronic circuitry thus enables the simple, cost-effective connection, for the purpose of communication, of a signal transmitter and/or a signal input unit to the video game console and/or the PC which the player/user desires to connect to the exercise machine—irrespective of the compatibility of the units involved.

BRIEF DESCRIPTION OF THE DRAWINGS

Additional advantages and features of the invention may be observed in the following description, by means of the figures, which show.

DETAILED DESCRIPTION

The device according to the invention enables the coupling, for the purpose of communication, of exercise machines, on one hand, and PCs and/or video game consoles, on the other hand. The particular attraction of this coupling for the purpose of communication lies in the fact that the physical operating conditions of the person using the exercise machine, which are recorded by means of the signal transmitter connected to the exercise machine, may be used to at least partially control a video game which can be run on a PC or a video game console. The electronic circuitry switched in between the exercise machine and the PC or the video game console serves for the conversion of the signals generated by the signal transmitter in additional information which can be processed by the PC or the video game console.

Known video game consoles commonly to be found in trade include the Microsoft X-Box, the Nintendo Gamecube and the Sony Playstation. A factor common to all of these video game consoles is that the games which run on them are played by means of the control device—for example, a joystick, a steering wheel, a game pad or a comptroller. Typical functions which are implemented by means of the control device are control commands such as "up" and "down", "left" and "right", "forward" and "back", "accelerate" and "brake". The device according to the invention enables one or more of these control functions to be performed, not by means of the control device provided, but rather, by means of an exercise machine connected to the PC or the video game console. This not only enables an interactive involvement of the player in the game to be played by him or her, but also the significantly increases the motivation to use the exercise machine.

One example of a control function which can be performed by means of the exercise machine is the control of the speed of a vehicle virtually represented in a video or PC game. This vehicle accelerates and attains a speed corresponding to the physical performance achieved by the player on the exercise machine. For example, in the case of a player sitting on a bicycle-type exercise machine, the faster the player pedals, the more quickly the vehicle or the figure depicted in the game moves. In this way, the coupling between the exercise machine and the PC or the video game console gives rise to the interactive involvement of the player in the video game, so that the player is required to use not only mental skills, but sports activity as well.

The signals issued by the signal transmitter for the purpose of controlling the speed advantageously originate from the measurement device of the exercise machine itself. For example, on bicycle-type exercise machines commonly to be found in trade, for the purpose of measuring the speed achieved at any given moment, a speed sensor is provided which records the speed and displays it on a display provided for the purpose. This signal, which, for example, is conducted by means of a two-strand cable from the speed-measuring device to the display, can be branched off by means of a suitable gating device and transmitted to the electronic circuitry provided according to the invention. The physical operating conditions recorded by the measurement electronics of the exercise machine—for example, speed, acceleration or the like—can thus be made available by means of signal conversion, in a simple and especially cost-effective way, to the PC or the video game console provided for use as a signal receiver. If a Y-gate is used for the branching of the measurement signals recorded by the measuring device of the exercise machine, it will thereby be possible to transmit the signal, not only to the signal receiver, but also to the display unit on the exercise machine.

Figure 1:
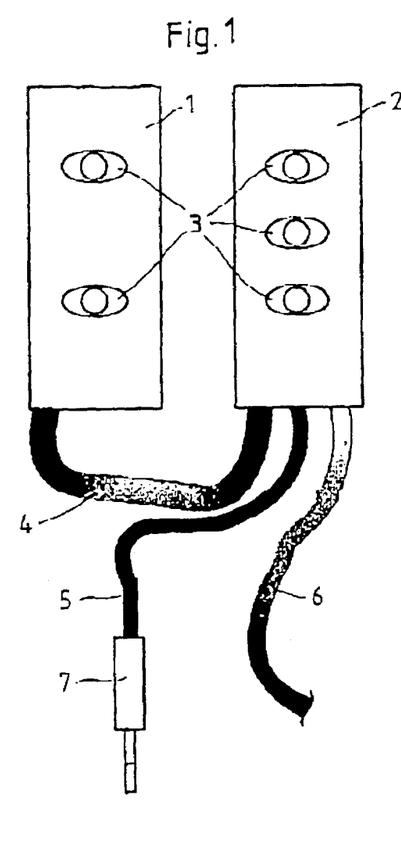
FIG. 1: a schematic representation of the device according to the invention.
Figure 6:
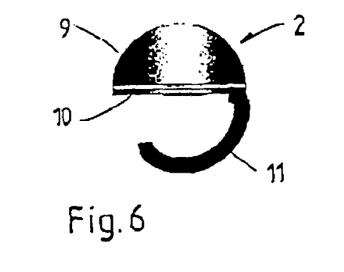
FIG. 6: a top view of a signal input unit.

FIG. 1 shows a schematic representation of the structure of the device according to the invention. Provided on the device are two housings, 1 and 2, each of which holds a signal input unit (not shown in detail). Each of the two housings 1 and 2 consists of a housing top 9 and a base-plate 10, as can be seen especially in FIG. 6. On the top of each of the two housings 1 and 2 are function keys 3, whereby the housing 1, which is shown at the left of FIG. 1, has two function keys, and the housing 2, which is shown at the right, has three function keys. The signal input units arranged within the housings 1 and 2 are connected to each other for the purpose of communication by means of a cable 4.

Figure 2:
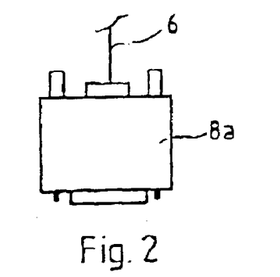
FIG. 2: a connector plug for a PC.
Figure 3:
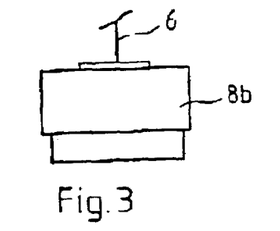
FIG. 3: a connector plug for a game console.
Figure 4:
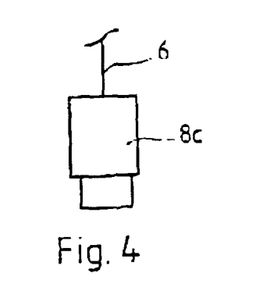
FIG. 4: a connector plug for a USB port.

In addition, arranged within housing 2 is electronic circuitry (not shown in detail), which, on one hand, by means of a connecting cable 5 and a stereo jack 7, is connected to a signal transmitter—for example, an exercise machine, and, on the other hand, by means of a connecting cable 6 and an appropriate plug 8*a* to 8*c*, is connected to a signal receiver—for example, a PC. Possible connection plugs 8*a* to 8*c* are shown in FIGS. 2, 3 and 4, whereby 8*a* represents a plug for a PC, 8*b* represents a PSX plug for a game console and 8*c* represents a USB plug.

By means of the stereo jack 7 and the cable 5, the signals supplied by the exercise machine—for example, the speed signals—are conducted to the electronic circuitry arranged within housing 2. In addition, the electronic circuitry receives signals from the signal input units arranged within housings 1 and 2, which are controlled by the player by means of the function keys 3. Both the signals from the exercise machine and the signals made available by the signal units are brought together by the electronic circuitry and modulated in such a way as to enable their use by the signal receiver connected thereto. For the purpose of connection of the device according to the invention to a video game console or a PC, the plugs 8*a* to 8*c* described above are provided.

Advantageously, the device according to the invention can be connected to a variety of signal receivers, so that the device according to the invention can be combined with both a PC and a game console. All that is necessary is to provide a suitable connector plug 8*a* to 8*c* and suitable electronic circuitry, as a function of the signal receiver to be connected.

Figure 5:
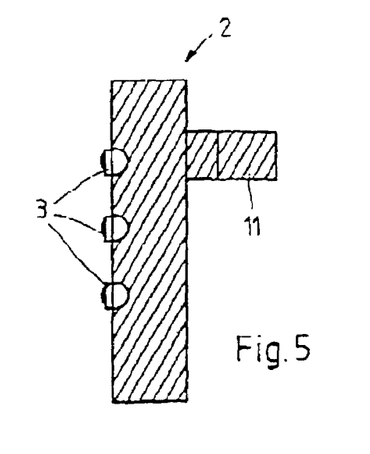
FIG. 5: a side view of a signal input unit.

FIG. 5 shows a side view of housing 2. The function keys 3, which protrude over the top surface of the housing top 9, can be easily recognized in this figure. This arrangement enables the function keys 3 to be easily reached and easily activated. Also to be noted in FIG. 5 is the bracket 11 which serves as a fastening device, which is arranged on the back of the housing 2, on the side farthest away from the function keys. The configuration of the bracket 11 can also be seen in FIG. 6. This figure shows that the bracket 11 is in the shape of an arc and fulfills the function of a clip. Accordingly, the bracket 11 is arranged on the base-plate 10, so that, for an especially economical configuration of the housing 2, the base-plate 10 and the bracket 11 can be made as a single piece.

Figure 7:
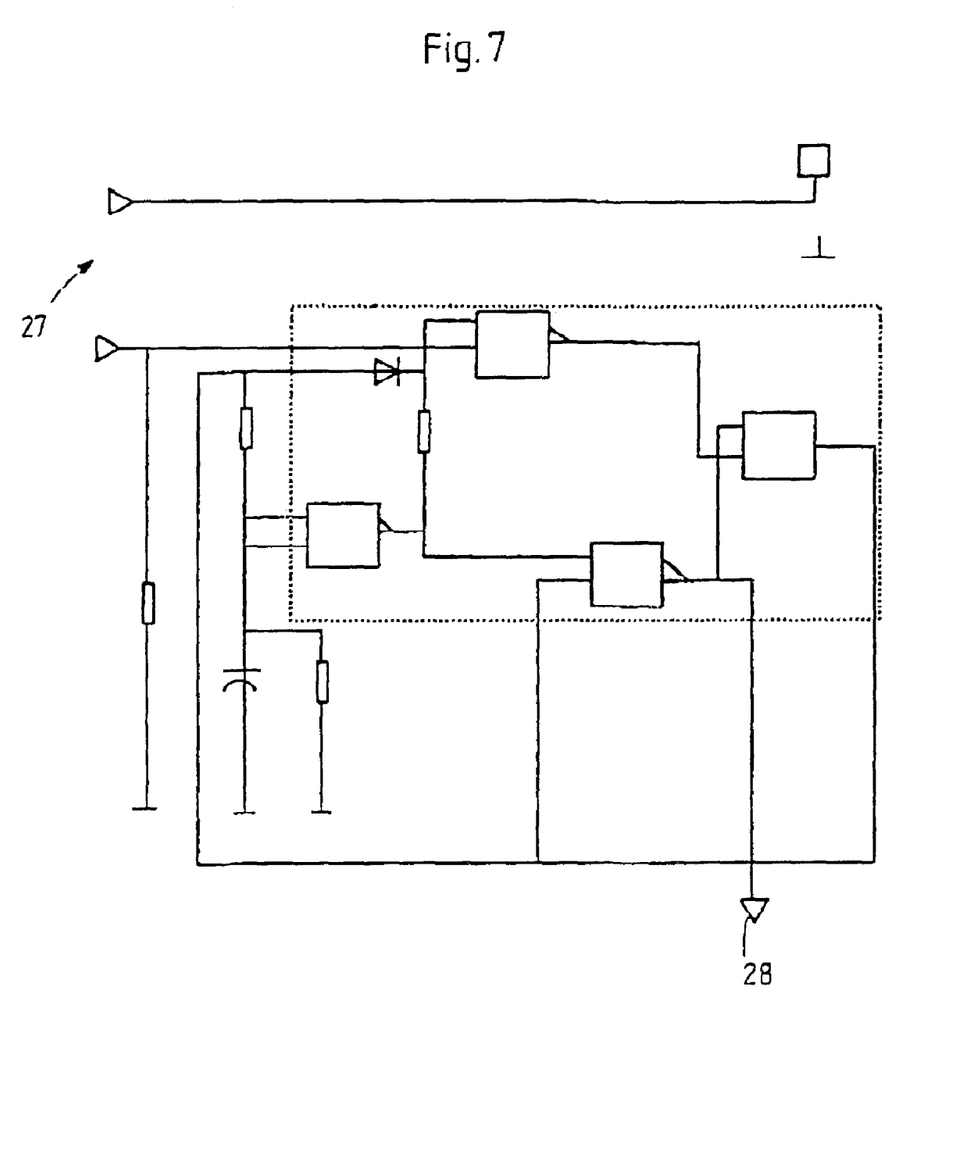
FIG. 7: a circuit diagram for the control of a PC.

FIG. 7 shows a schematic representation of a circuit diagram for the control of a PC. The signal input is designated in this figure as 27 and the signal output as 28.

Figure 8:
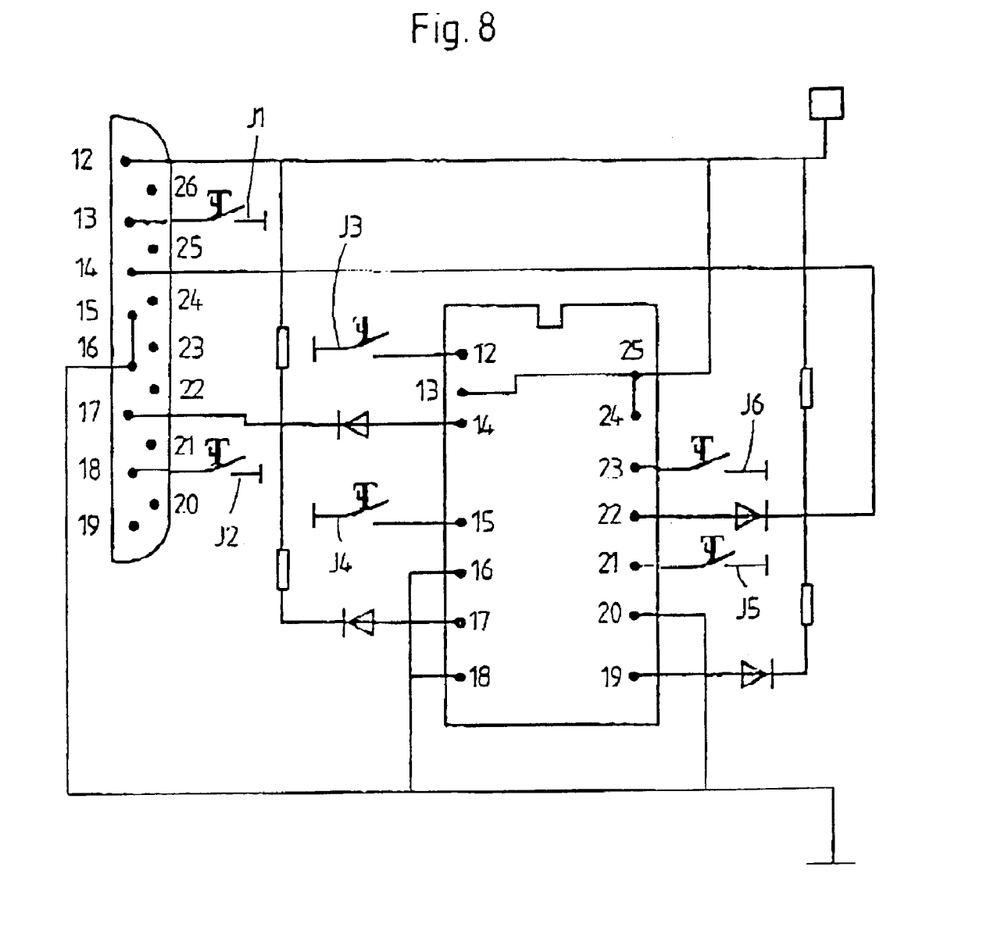
FIG. 8: a circuit diagram concerning the function keys for the control of a PC.

FIG. 8 show systematic representation of the function key arrangement when five function keys are used—as is the case, for example, in connection with a PC to be used as the signal receiver. The following constellation for the layout of pins 1–25 [Translator's note: as written in the original German document; this is probably an error for "pins 1–15"] results:

| | |
|---|---|
| Pin 1 (reference number 12): | +5 V |
| Pin 2 (reference number 13): | Button 1 |
| Pin 3 (reference number 14): | Joystick X1 |
| Pin 4 (reference number 15): | GND |
| Pin 5 (reference number 16): | GND |
| Pin 6 (reference number 17): | Joystick Y1 |
| Pin 7 (reference number 18): | Button 2 |
| Pin 8 (reference number 19): | +5 V |
| Pin 9 (reference number 20): | +5 V |
| Pin 15 (reference number 21): | +5 V |
| Pin 10 (reference number 22): | Button 4 |
| Pin 11 (reference number 23): | Joystick X2 |
| Pin 12 (reference number 24): | GND |
| Pin 13 (reference number 25): | Joystick Y2 |
| Pin 14 (reference number 26): | Button 3 |

With reference to the circuitry shown in FIG. 8, the following applies:

J1=Button 1
J2=Button 2
J3=forward
J4=back
J5=right
J6=left

Figure 9:
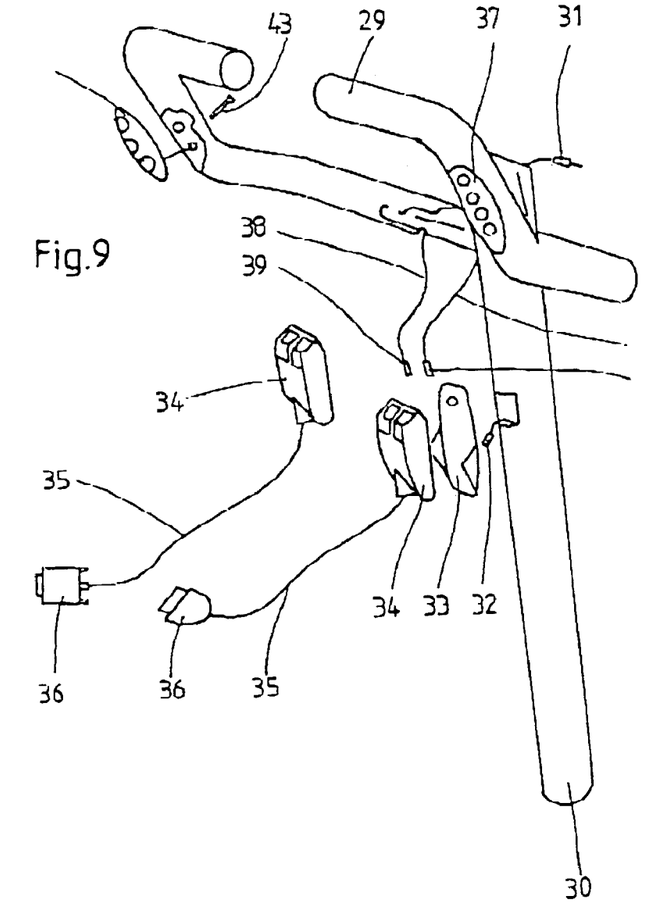
FIG. 9: a three-dimensional schematic representation depicting the use of the device according to the invention in connection with a bicycle-type exercise machine.

FIG. 9 shows a representation in perspective of the handlebars 29 of a bicycle-type exercise machine (not shown in detail). The handlebars 29 are fastened to a holder 30, and the height of the handlebars 29 can advantageously be adjusted relative to the holder 30. The holder 30 is in turn connected to the body of the bicycle-type exercise machine (not shown in detail).

For the purpose of recording the sports performance achieved in the course of a training program on the bicycle-type exercise machine, such as speed or acceleration, the bicycle-type exercise machine is provided with a speed sensor, which—for example, by means of a magnetic device on the flywheel of the bicycle-type exercise machine—records the speed. For display of the sport performance achieved, a display unit (not shown in detail in this figure) is provided, which is connected to the measuring device of the bicycle-type exercise machine by means of a cable installed in the hollow holder 30 and the stereo jack 31. This signal is branched by means of the gating device arranged within the holder 30 and conducted to the electronic circuitry provided according to the invention, which is located within housing 34, by means of an additional cable which is provided with a plug 32 on the end thereof. The measuring device provided in the bicycle-type exercise machine accordingly serves as a signal transmitter for the electronic circuitry of the device according to the invention.

Arranged on the handlebars 29 are two control input units 37, whereby one control input unit 37 is located on each arm of the handlebars 29. In the design shown in this figure, the control input units 37 are permanently arranged on the handlebars 29 and fastened thereto by means of suitable fastening screws 43, so that they do not slip off. Alternatively, it is also possible to provide the control input units 37 as a retrofit set, which would then not be permanently fastened to the handlebars 29, but could be only temporarily fastened thereto by the user.

Figure 10:
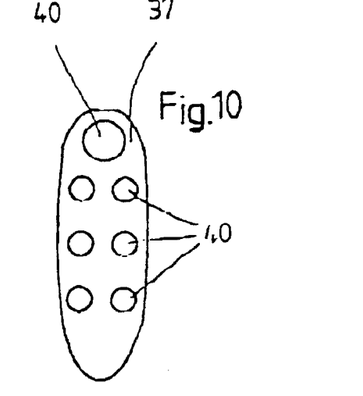
FIG. 10: a top view of a control input unit for the device according to the invention.

The control input unit 37, which is shown in greater detail in FIG. 10, has function keys 40, by means of which the user/player, according to the layout of the function keys, can select control commands and can transmit controls, in the form of suitable control signals, by means of the connecting cable 38 and its connector 39—which, in this design, are shown within the handlebars 29—to the controls arranged within housing 34.

Figure 11:
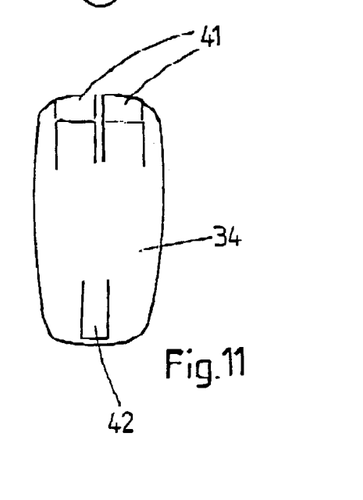
FIG. 11: a top view of a housing for the electronic circuitry for the device according to the invention.

For the connection, for the purpose of communication, of the electronic circuitry arranged within housing 34, on one hand, and the control input units 37, on the other hand, the housing 34 exhibits sockets 41, which correspond to the plugs 39, as may be especially observed in FIG. 11. All that the user must do, in order to establish a connection, for the purpose of communication, is to introduce the connector plugs 39 into the sockets 41 provided on housing 34. The connection, for the purpose of communication, between the electronic circuitry and the measuring device—that is, the signal transmitter—is similarly made. In this case as well, all that is required for a coupling is to introduce the plug 32 into a socket (not shown in detail in the figure) which is provided on housing 34. As soon as this is accomplished, the control input units 37, the measurement electronics of the exercise machine which serves as a signal transmitter, and the electronic circuitry arranged within housing 34 are connected to each other in such a way as to enable communication.

For a separate arrangement of the electronic circuitry, said circuitry is arranged within a correspondingly shaped housing 34, which, by means of a sole plate 33, may be attached, in a replaceable manner, to the holder 30 of the exercise machine. With regard to the connection, for the purpose of communication, between the electronic circuitry and the signal transmitter, we shall now mention an alternative design. Specifically, in order to achieve connection, for the purpose of communication, with the electronic circuitry, it is possible to provide for the plug 32, which is connected to the signal transmitter, to be connected to the sole plate 33, which, in turn, is provided with plug-like pole arrangements on the side facing the housing 34. Said pole arrangements engage corresponding contacts on the housing 34, as soon as the housing 34 is introduced into the sole plate 33. This alternative design provides an even simpler method of assembly, relative to that described above.

For the coupling of the electronic circuitry to a signal receiver (not shown in the figures)—for example, a PC or a video game console—the connecting cable 35 is used, along with its connector plug 36. In this connection, FIG. 9 shows two different housing-connecting cable-connector plug arrangements. Each of these different embodiments serves for the coupling of the signal transmitter and the control input units 37 to a different signal receiver. A distinction should be made between the different arrangements of the connector plug 36. One connector plug 36 is used for coupling to a PC; on the other hand, the other connector plug 36 is used for coupling to a game console. Accordingly, there are also differences between the electronic circuitry used in each of the two housings 34. One set of electronic circuitry is configured for coupling to a PC, and the other set of electronic circuitry is configured for coupling to a video game console.

The device according to the invention is advantageously used for the connection, for the purpose of communication, of control input units 37 and a measuring device which serves as a signal transmitter to a video game console or a PC (not shown in detail in the figures). Especially advantageous, in this context, is the modular structure, which enables—according to the PC or the video game console to be used—the arrangement of the electronic circuitry required for connection, including the relevant connecting cable 35 and the relevant connector plug 36, after the manner of a modular construction system on the bicycle-type exercise machine, preferably on the holder 30. This type of arrangement opens the possibility of having the manufacturer pre-assemble the handlebars 29, along with the holder 30, as well as the relevant control input units 37 and the cable and plug which must be provided in order to enable connection for the purpose of communication, as a single module, whereby said module is advantageously totally independent, with regard to the compatibility of the signal receiver to be connected at a later stage. Connection for the purpose of communication between the individual components is accomplished by means of the separately provided arrangement of the electronic circuitry within the housing 34, said electronic circuitry being selected as a function of the signal receiver to be connected thereto. The arrangement of the housing 34, which contains the electronic circuitry, thereby becomes appreciably simpler, because all that is necessary is to introduce the housing 34 into the sole plate 33 provided on the holder 30. For ease of assembly, it is possible, for example, to provide holding clips on the sole plate 33, so that the housing 34 is simply clipped into the sole plate 33 in order to achieve a durable fastening. Once this is done, all that is required for connection for the purpose of communication is to introduce the plugs described above into the sockets provided for the purpose on the housing 34, whereby the connecting cable 35 is to be introduced into the connector socket 42 and the plugs 39 into the connector sockets 41.

In order to further reduce manufacturing and assembly costs, the control input unit 37 can be made symmetrical, so that it can be arranged on both the left and the right side of the handlebars 29.

REFERENCE NUMbER LIST

1 Housing
2 Housing
3 Function key
4 Cable
5 Connector cable
6 Connector cable
7 Stereo jack
8a to 8c Connector plug
9 Housing top
10 Baseplate
11 Bracket
12 to 26 Pin
27 Input
28 Output
29 Handlebars
30 Holder
31 Stereo jack
32 Plug
33 Sole plate
34 Housing
35 Connector cable
36 Connector plug
37 Control input unit
38 Connector cable
39 Connector plug
40 Function key
41 Socket
42 Socket
43 Screw

The invention claimed is:

1. Device for signal transmission from a signal transmitter which senses physical operating conditions to a separately installed signal receiver, the device includes:
   the signal transmitter connected with an exercise machine in order to sense at least one physical operating condition;
   the device including a modular structure comprising:
     a gating device for receiving the signal generated by the signal transmitter;
     an electronic circuit connected with the gating device and converting the signals generated by the signal transmitter to a signal structure required for the signal receiver; and
     communication means for allowing the electronic circuitry to communicate with the signal receiver;
   wherein the signal receiver comprises, a PC or a video game console.

2. Device according to claim 1, wherein the signal transmitter is an integral part of an exercise machine.

3. Device according to claim 1, wherein the signal transmitter includes a speed sensor.

4. Device according to claim 1, wherein the signal transmitter, the signal receiver and the electronic circuit are connected to each other, for the purpose of communication, by means of a cable and/or radio.

5. Device according to claim 1, wherein at least one additional signal input unit is provided.

6. Device according to claim 5, wherein the additional signal input unit is connected, for the purpose of communication, to the electronic circuit.

7. Device according to claim 5, wherein the additional signal input unit exhibits a plurality of function keys.

8. Device according to claim 7, wherein the function keys accomplish a corresponding determined signal generation, as a function of the signal receiver connected.

9. Device according to claim 1, wherein the signals generated by the signal transmitter and by the signal input units can be jointly processed by means of the electronic circuit and can be modulated as a function of the signal structure required by the signal receiver connected at the time.

10. Device according to claim 1, wherein two signal input units are provided, each of which is arranged within a housing.

11. Device according to claim 10, wherein the electronic circuit is arranged within one of the housings for the signal input units.

12. Device according to claim 10, wherein the housings for the signal input units have a fastening device, which is arranged on the back of the housing, on a side farthest away from function keys.

13. Device according to claim 12, wherein the fastening device is in the form of a clamping bracket.

14. Device according to claims 12, wherein the housing is constructed in two parts and is made of plastic.

15. Device according to claim 13, wherein a bottom of the housing and the fastening device are constructed as a single piece.

16. Device according to claim 1, wherein a set of electronic circuitry is arranged separately and is connected, for the purpose of communication, to the signal transmitter, the signal input unit and the signal receiver.

17. Device according to claim 16, wherein a multi-pole connector cable is used for connection, for the purpose of communication, between the electronic circuitry and the signal receiver.

18. Device according to claim 17, wherein the connecting cable on the signal receiver side is provided with a connector plug shaped so as to correspond with a connector socket on the signal receiver.

19. Device according to claim 18, wherein, as a function of the signal receiver to be connected to the device, the corresponding electronic circuitry and the respective connecting cable including the connection plug can be combined with each other after the manner of a modular construction system.

20. Device according to claim 1, wherein the signal transmitter, the signal receiver, the signal input unit and the electronic circuitry are connected to each other, for the purpose of communication, by radio.

21. Device according to claim 20, wherein a Bluetooth module is provided as the radio module.

22. Device according to claim 1, wherein a housing for the electronic circuitry may be connected in a replaceable manner to the exercise machine.

* * * * *